United States Patent

Fitterer et al.

(10) Patent No.: US 8,560,556 B2
(45) Date of Patent: Oct. 15, 2013

(54) DYNAMIC ALIASING OF MULTI-VALUED BINARY ATTRIBUTES IN DIRECTORIES

(75) Inventors: Annemarie R. Fitterer, Austin, TX (US); Ramakrishna J. Gorthi, Pune (IN); Chandrajit G. Joshi, Pune (IN); Romil J. Shah, Pune (IN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 12/685,867

(22) Filed: Jan. 12, 2010

(65) Prior Publication Data

US 2011/0173211 A1 Jul. 14, 2011

(51) Int. Cl.
*G06F 17/30* (2006.01)
(52) U.S. Cl.
USPC .......................................... 707/752; 715/234
(58) Field of Classification Search
USPC ............................. 707/752, 736, 600; 715/234
See application file for complete search history.

(56) References Cited

U.S. PATENT DOCUMENTS

| | | | |
|---|---|---|---|
| 6,970,873 B2 * | 11/2005 | Fu et al. ........................ | 707/752 |
| 7,051,114 B1 | 5/2006 | Ravishankar et al. | |
| 2003/0220873 A1 * | 11/2003 | Wagner et al. .................. | 705/40 |
| 2004/0010514 A1 | 1/2004 | Agarwal et al. | |
| 2005/0102297 A1 | 5/2005 | Lloyd | |
| 2005/0240621 A1 | 10/2005 | Robertson et al. | |
| 2005/0289174 A1 * | 12/2005 | Kolli et al. .................... | 707/102 |
| 2006/0020585 A1 | 1/2006 | Harvey | |
| 2006/0218183 A1 * | 9/2006 | Ivey et al. .................. | 707/104.1 |

OTHER PUBLICATIONS

Gorthi, et al; Algorithm for Compression of LDAP Entries using DN Pointers; IP.COM No. IPCOM000175586D; Oct. 15, 2008.
RFC 2255; The LDAP URL Format; T. Howes et al; Dec. 1997; http://datatracker.ietf.org/doc/rfc2255/.
RFC 4510; Lightweight Directory Access Protocol (LDAP), Technical Specification Road Map ; K. Zeilenga; Jun. 2006; http://datatracker.ietf.org/doc/rfc4510/.
RFC 4516; Lightweight Directory Access Protocol (LDAP), Uniform Resource Locator ; M. Smith et al; http://datatracker.ietf.org/doc/rfc4516/.
RFC 3377; Lightweight Directory Access Protocol (LDAP), Technical Specification; J. Hodges et al; http://datatracker.ietf.org/doc/rfc3377/.

* cited by examiner

*Primary Examiner* — Monica Pyo

(57) ABSTRACT

Dynamic aliasing of multi-valued binary attributes in a directory. A plurality of binary attribute-values are stored in the directory that in the aggregate form the multi-valued binary attribute. For each binary attribute-value, there is stored metadata describing characteristics of the binary attribute-value with which it is associated. A preference is received from a user of the directory, the preference being based on the characteristics of the multi-valued binary attribute. The preference is associated with at least one binary attribute-value. A set of multi-valued binary attribute-values are associated for the user based on the preference received from the user and the set of multi-valued binary attribute-values are accessed.

11 Claims, 3 Drawing Sheets

DYNAMIC ALIASING OF MULTI-VALUED BINARY ATTRIBUTES IN DIRECTORIES

BACKGROUND OF THE INVENTION

This invention is related generally to the fields of networking, computing, and directories, and specifically to providing an aliasing operation in directories such as hierarchical directories such that the binary data stored in entries in a directory can be accessed using aliases without storing multiple copies of the entries for each user. The disclosure uses LDAP (Lightweight Data Access Protocol) as an example. However, the principles of the invention can be extended to other directory structures. The disclosed, illustrative embodiment is designed to execute on a computer such as a desktop, a workstation, a laptop or general-purpose mainframe computers, although alternative embodiments such as special-purpose electronics are possible. LDAP is an open industry standard defining a method for accessing and updating information in a directory. A directory server is an implementation of the LDAP protocol. LDAP is basically a read-centric repository, wherein users can store any kind of data such as names and addresses, binary information such as songs, images and video, applications, files, printers, network resources etc. Data is stored in the directory servers in the form of tree entries. LDAP and other types of directories typically have no way of sharing binary values across a set of directory entries. Typically, users must generate and store independent copies of binary-encoded data for each entry, even if it's the same data that's getting stored. Moreover, there is no good way of accessing binary data based upon some user defined preferences. This can be extremely wasteful of storage space.

BRIEF SUMMARY OF THE INVENTION

According to one embodiment of the invention, there is disclosed a method of dynamic aliasing of multi-valued binary attributes in a directory. Dynamic aliasing refers to associating a binary attribute-value stored in the directory via a different attribute. A plurality of binary attribute-values are stored in the directory that in the aggregate form the multi-valued binary attribute. For each binary attribute-value, there is stored metadata describing characteristics of the binary attribute-value with which it is associated. A preference is received from a user of the directory, the preference being based on the characteristics of the multi-valued binary attribute. The preference is associated with at least one binary attribute-value. A set of multi-valued binary attribute-values are associated for the user based on the preference received from the user and the set of multi-valued binary attribute-values is accessed.

According to a second embodiment, a computer program product contains computer-readable program code for dynamic aliasing of a multi-valued binary attribute in a directory. The computer program product comprises program code for storing a plurality of binary attribute-values in the directory that in the aggregate form the multi-valued binary attribute; program code for storing metadata for each binary attribute-value, each metadata describing characteristics of the binary attribute-value with which it is associated; program code for receiving a preference from a user of the directory, the preference being based on the characteristics of the multi-valued binary attribute; program code for associating the preference with at least one binary attribute-value, program code for identifying a set of multi-valued binary attribute-values for the user based on the preference received from the user; and program code for accessing the set of multi-valued binary attribute-values.

The computer program product can be stored as computer instructions in a computer readable storage medium in a data processing system or stored as instructions in a computer readable storage medium in a server data processing system. The instructions can be downloaded over a network from a remote data processing system.

According to a third embodiment, there is disclosed a system of dynamic aliasing of multi-valued binary attributes in a directory. A memory stores a plurality of binary attribute-values that in the aggregate form the multi-valued binary attribute. For each binary attribute-value, there is stored metadata describing characteristics of the binary attribute-value with which it is associated. The system receives a preference from a user of the directory; the preference is based on the characteristics of the multi-valued binary attribute. The system associates the preference with at least one binary attribute-value. A set of multi-valued binary attribute-values are associated for the user based on the preference received from the user and the set of multi-valued binary attribute-values are accessed by the system.

DETAILED DESCRIPTION OF THE INVENTION

Figure 1:
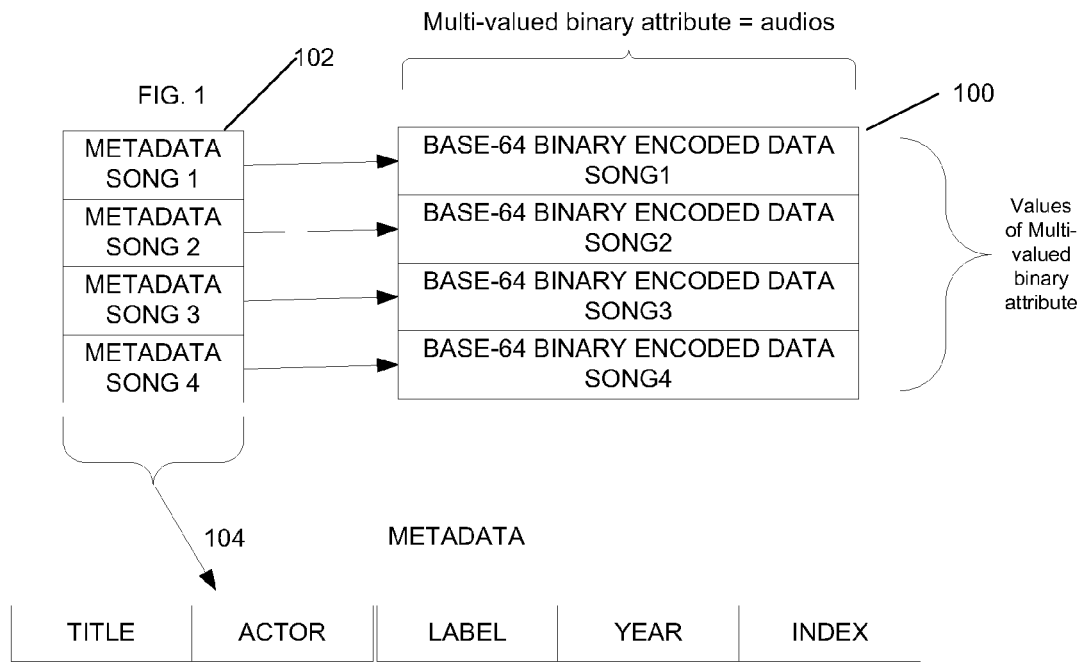
FIG. 1 shows an illustrative data structure for storing songs in a binary encoded base-64 format, along with metadata that contains information associated with each song.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the designer's computer, partly on the designer's computer, as a stand-alone software package, partly on the designer's computer and partly on a remote computer or entirely on the remote computer or server. In the latter scenario, the remote computer may be connected to the designer's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The drawings show an example of how the invention can be put to use. The example is a depiction of a way that songs can be stored in LDAP and how those songs are referenced for creating and accessing users' playlist. By way of example, the invention is illustrated using LDAP (Lightweight Directory Access Protocol). Also by way of example, the invention is disclosed using a playlist of binary-encoded songs, either in plain audio format or as video productions of songs. Of course, the invention is neither limited to creating a song playlist, nor to accessing and playing songs from a playlist. The multi-valued binary-encoded attributes can be associated with virtually any type of binary object. For example the binary attributes might represent encodings of paintings, images, program code and objects of a similar nature.

With reference to FIG. 1, there is shown a simplified view of how binary-encoded data might be stored in an LDAP directory to associate a binary attribute-value with metadata describing characteristics of the attribute-value with which it is associated. In the example of FIG. 1, data is stored for four songs 1 through 4. The right side of the data structure at 100 contains the binary attribute-values of each song or video track. The multi-valued attribute that identifies the set of binary song data is "audios". Each entry of the attribute, for song 1 for example, is an attribute-value. The left side of the data structure at 102 contains metadata that describes information relating to the associated song track or video. The metadata is basically an ASCII, human readable characterization of the binary data that might be encoded in base-64 for example. Illustrative details of the metadata are further shown at 104. Metadata for each song or video song might contain a song title, the song actor, a company label, the year of song release, copyright information, and so on.

Figure 2:
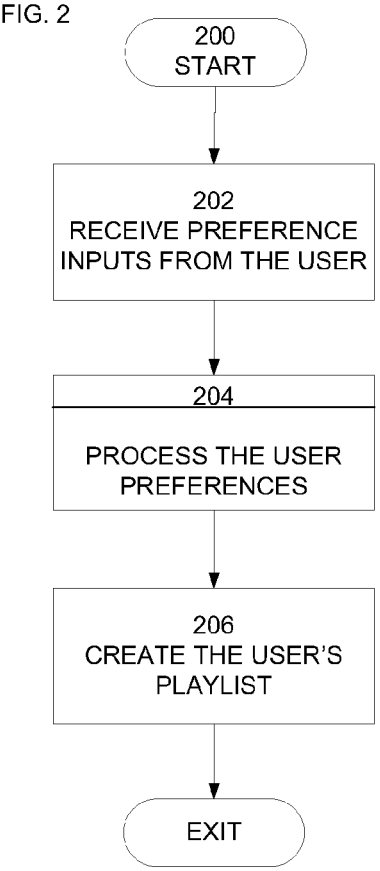
FIG. 2 shows a functional-level flowchart of the operations that occur to create a user playlist of songs.

FIG. 2 illustrates a simplified, functional set of steps that are performed in creating a user playlist that identifies a set of binary attribute-values based on the attributes stored in the song metadata. The process starts at 200. In step 202, preference inputs are received from a user. Such preferences might be song titles, song actors, the years those songs are released, the labels and so on, depending on what information is stored in the metadata for each song. Step 204 represents a function that is described in more detail below of processing the user preferences to create a user playlist. Step 206 creates the playlist after all user preferences are processed in 204.

Figure 3:
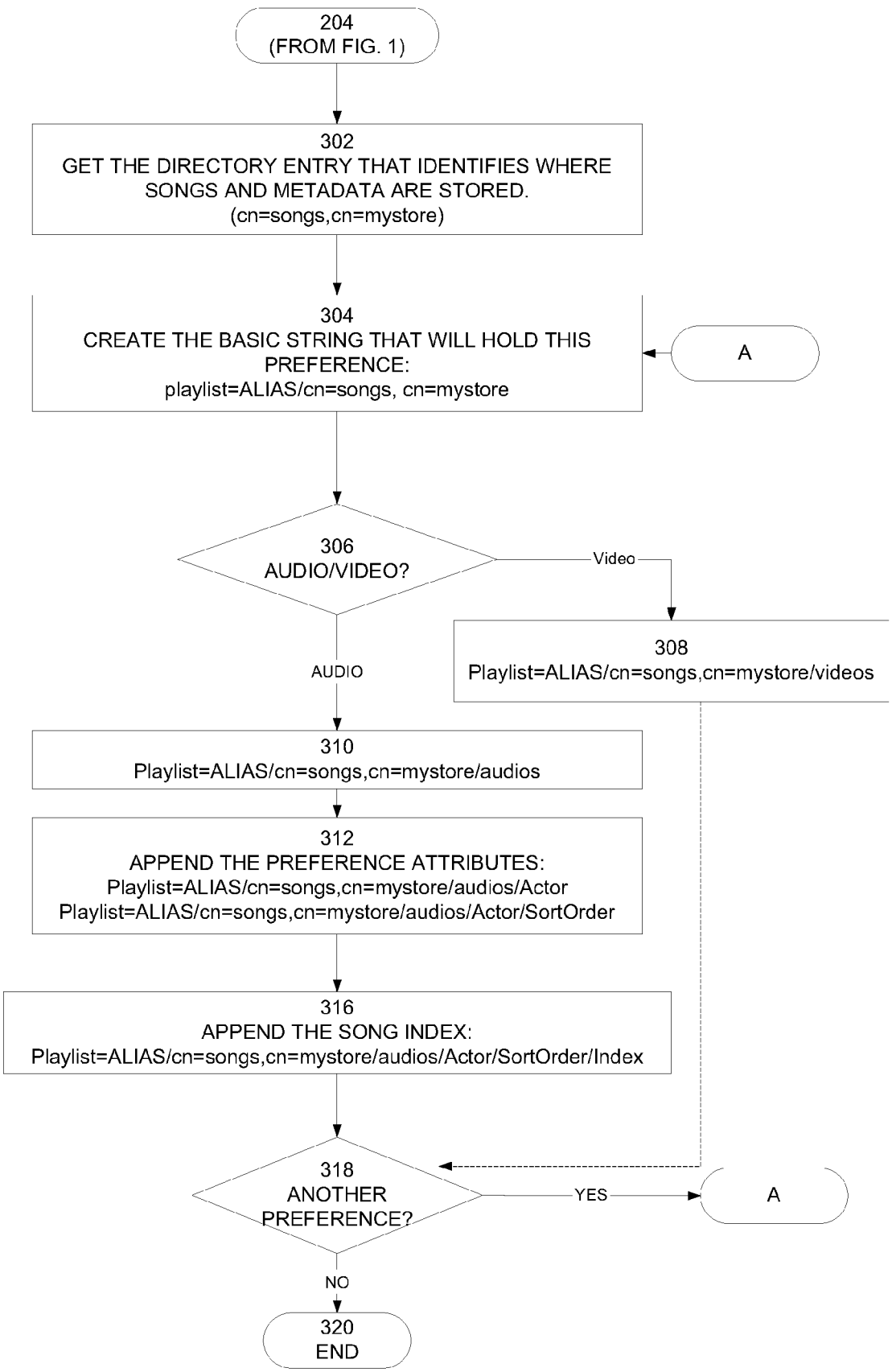
FIG. 3 shows a more detailed flowchart of the process step 204 of FIG. 2 in which user preferences are processed during the creation of a playlist.

FIG. 3 shows the user preferences step of 204 in more detail. For purposes of this example, it is assumed that a directory of songs already exists in both audio and video formats and that the LDAP common name that identifies the song directory is (cn=songs, cn=mystore). The steps of FIG. 3 will generate one or more ALIAS statements with each having the illustrative format "ALIAS/DN/Attribute/SortLabel/SortOrder/Index", where DN stands for Distinguished Name, which is well understood by workers skilled in LDAP. Attribute is a characterizing name, such as "audios" or "videos", SortLabel is an attribute label that is used to sort LDAP entries that match the playlist, SortOrder describes whether a user wants matching entries sorted or not sorted, and if sorted whether in ascending or descending order; Index is a relative pointer to a matching binary song attribute-value, which is used to associate metadata with a corresponding binary attribute-value. The word "ALIAS" in the string is used to reference entries anywhere within the directory tree of songs. Conceptually, an alias is simply a pointer to the directory information tree entry that it represents. This allows songs to be stored only once in the directory tree, but referenced by many users as the users individually desire according to user preferences set out in their playlists. The ALIAS statement is described in section 2.6 of Internet Task Force RFC 4512, entitled "Lightweight Directory Access Protocol (LDAP): Directory Information Models", by K. Zeilenga and dated June 2006. In the illustrative example described herein, the Distinguished Name is "cn=songs, cn=mystore", Attribute is either "audio" or "video", SortLabel is "Actor" meaning that matching entries are to be sorted on the actors/performer's name, SortOrder is either −1, 0 or 1 to represent respectively no sorting, ascending or descending order, and Index is a value or set of values that identify where to locate an Actor's songs in the LDAP directory. In this example, all of the binary song values are stored against the characterizing attribute "audios" or "videos". Conceptually, an audio LDAP song entry is described by dn: cn=songs,cn=mydata
audios:: <song 1>
audios:: <song 2>

As you see above, all the audio songs are stored against a single attribute "audios". Therefore, "audios" becomes the multi-valued binary attribute that is used to point to a song attribute-value in an ALIAS statement.

In FIG. 3, step 302 fetches the basic directory address (cn=songs, cn=mystore) where the songs and associated metadata are stored. In LDAP, cn stands for "common name", a notation that is well-known to workers skilled in LDAP. Step 304 creates the basic string that will define this particular user preference. In this example, the basic string is set to "ALIAS/cn=songs, cn=mystore".

Step 306 determines whether the user has inputted a preference for audio or for a video song production. Assuming that the user has specified "audio", step 310 appends "audios" to the preference string being generated to form "ALIAS/cn=songs, cn=mystore/audios". In step 312, it is assumed that the user has specified a sort preference based on Actor (performer). Therefore, the first action of 312 is to append "Actor" to the string in the SortLabel position. This specifies that matching directory entries will be sorted based on the Actor's name. The String then is "ALIAS/cn=songs, cn=mystore/audios/Actor". The second action of 312 appends a sort order (SortOrder) specified by the user. The string might be "ALIAS/cn=songs, cn=mystore/audios/Actor/0" meaning an ascending sort on Actor names matching the playlist. The last step 316 in this example is to append an index to the preference string to locate the desired song or songs. The string might then be "ALIAS/cn=songs,cn=mystore/audios/Actor/0/−1". The final value −1 in the index field indicates that the user selects all songs in the directory to be in the playlist. On the other hand, a user might specify as the last field a single value such as "2" meaning that song number 2 in the list of values is selected. Or the user might specify a list of songs (2, 4, 8) or a range (2-8) of song numbers. This completes the generation of the first user preference and the preference is stored in the user playlist. Additional user preferences might also be specified by the user. For example, the user might also wish to select some video song productions. Step 318 determines if additional preferences are specified. In this event, step 318 transfers control to step 304 to begin the generation of another preference string. Step 304 again generates the basic string "ALIAS/cn=songs,cn=mystore". Assuming that the second preference is for videos, step 306 transfers to step 308 where "videos" is appended to the basic string to form "ALIAS/cn=songs,cn=mystore/videos". Following step 308 are steps (represented by a dashed flowline in FIG. 3) that are equivalent to steps 312 and 316, except that "videos" is retained in the preference string as the characterizing Attribute.

When all user specified preferences have been processed and the playlist is complete, step 318 ends the creation process at 320.

Figure 4:
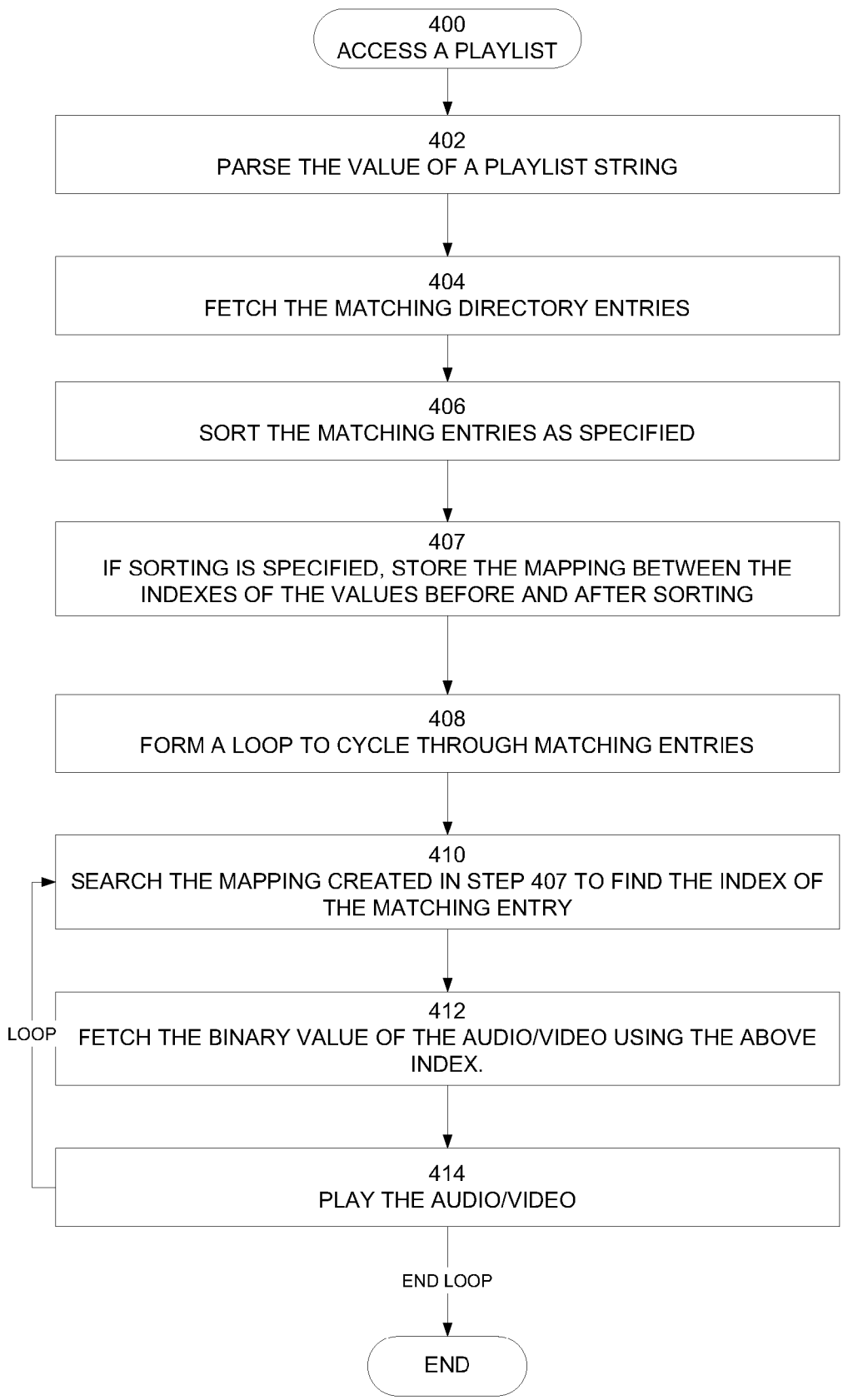
FIG. 4 illustrates how a song might be accessed and performed using a playlist that has been created for a user.

FIG. 4 illustrates steps that might be performed in accessing and performing the matching directory entries (audios/videos) according to a user preference list. Step 402 parses the value of a playlist string that has been created by or for the user. It is assumed for example, that the playlist entry is "ALIAS/cn=songs,cn=mystore/audios/Actor/0/−1"

In the string, "audios" means that binary audio entries in the directory are to be accessed. The "−1" at the end of the string means that all binary-encoded audio songs are to be accessed. "Actor/0" means that the entries are to be sorted on the actor's name in the metadata in ascending order before the long list is performed. In other words all songs featured on Actor A would appear first, followed by songs featured on Actor B, then Actor C etc. These functions are performed at steps 404, 406 and 407. Step 408 forms a loop based on the number of entries in the playlist. Then in this example, the entries are accessed and played in the sorted order at steps 410, 412 and 414. When all matching songs have been performed, the playloop might end, or repeat, or any other desired action might be performed.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method of dynamic aliasing of a multi-valued binary attribute in an LDAP directory, comprising
    storing a plurality of binary attribute-values in the directory that in the aggregate form the multi-valued binary attribute;
    storing human-readable metadata for each binary attribute-value, each metadata describing characteristics of the binary attribute-value with which it is associated,
    assigning human-readable aliases to the binary attributes, and
    accessing binary attribute-values associated with the specified preferences using the assigned human-readable aliases, wherein the human-readable metadata for each binary attribute-value includes an index that identifies the location in the directory for the binary attribute-value;
    assigning a human-readable distinguished name including an associated index to reference each multi-valued attribute value;
    receiving a preference from a user of the directory, the preference being based on the characteristics of the multi-valued binary attribute;
    associating the preference with at least one binary attribute-value; and
    identifying a set of multi-valued binary attribute-values for the user based on the preference received from the user; and
    wherein identifying a set of multi-valued binary attribute-values for the user based on the preference received from the user further comprises building an alias string based on the user preference that identifies a storage location of a value of a multi-valued attribute.

2. The method of claim 1 wherein the user preference specifies an attribute in the metadata of associated multi-valued binary attribute-values that are used to sort the set of multi-valued binary attribute-values.

3. The method of claim 2 wherein the user preference specifies a sort order of the set of multi-valued binary attribute-values.

4. A non-transitory computer readable storage medium comprising a computer-program product, the computer-program product comprising computer-readable program code for dynamic aliasing of a multi-valued binary attribute in a LDAP directory, comprising
    program code for storing a plurality of binary attribute-values in the directory that in the aggregate form the multi-valued binary attribute;
    program code for storing human-readable metadata for each binary attribute-value, each metadata describing characteristics of the binary attribute-value with which it is associated,
    program code for assigning human-readable aliases to the binary attributes, and program code for accessing binary attribute-values associated with the specified preferences using the assigned human-readable aliases, wherein the human-readable metadata for each binary attribute-value includes an index that identifies the location in the directory for the binary attribute-value; and
    program code for assigning a human-readable distinguished name including one of the indexes to reference each multi-valued attribute value;
    program code for receiving a preference from a user of the directory, the preference being based on the characteristics of the multi-valued binary attribute;
    program code for associating the preference with at least one binary attribute-value; and
    program code for identifying a set of multi-valued binary attribute-values for the user based on the preference received from the user;
    wherein the program code for identifying a set of multi-valued binary attribute-values for the user based on the preference received from the user further comprises program code for building an alias string based on the user preference that identifies a storage location of a value of a multi-valued attribute.

5. The computer program product of claim 4 wherein the user preference specifies an attribute in the metadata of associated multi-valued binary attribute-values and further comprising program code for sorting the set of multi-valued binary attribute-values.

6. The computer program product of claim 5 wherein the program code for sorting further comprises program code for sorting in a sort order specified in the user preference.

7. The computer program product of claim 4, wherein the program code are stored as computer instructions in a computer readable storage medium in a data processing system, and wherein the instructions are downloaded over a network from a remote data processing system.

8. The computer program product of claim 4, wherein the computer code are stored as instructions in a computer readable storage medium in a server data processing system, and wherein the instructions are downloaded over a network to a remote data processing system for use in a computer readable storage medium with the remote system.

9. A system of dynamic aliasing of a multi-valued binary attribute in a LDAP directory, comprising
    a memory for storing a plurality of binary attribute-values in the directory that in the aggregate form the multi-valued binary attribute;
    the memory also storing human-readable metadata for each binary attribute-value, each human readable metadata describing characteristics of the binary attribute-value with which it is associated; including an index that identifies the location in the directory for the binary attribute-value in the binary attribute with which it is associated;
    apparatus for assigning human-readable aliases to the binary attributes, and apparatus for accessing binary attribute-values associated with the specified preferences using the assigned human-readable aliases, wherein the human-readable metadata for each binary attribute-value includes an index that identifies the location in the directory for the binary attribute-value; and
    apparatus for assigning a human-readable distinguished name including an associated index to reference each multi-valued attribute value;
    apparatus for receiving a preference from a user of the directory, the preference being based on the characteristics of the multi-valued binary attribute;
    apparatus for associating the preference with at least one binary attribute-value; and
    apparatus for identifying a set of multi-valued binary attribute-values for the user based on the preference received from the user,
    wherein the apparatus for identifying a set of multi-valued binary attribute-values for the user based on the preference received from the user further comprises apparatus for building an alias string based on the user preference that identifies a storage location of a value of a multi-valued attribute.

10. The system of claim 9 wherein the user preference specifies an attribute in the metadata of associated multi-valued binary attribute-values that are used to sort the set of multi-valued binary attribute-values.

11. The system of claim 10 wherein the user preference specifies a sort order of the set of multi-valued binary objects.

* * * * *